US010951711B2

(12) United States Patent
Hardman, III et al.

(10) Patent No.: US 10,951,711 B2
(45) Date of Patent: Mar. 16, 2021

(54) METHODS AND SYSTEMS FOR ACQUIRING AND PROCESSING DATA AT INTELLIGENT EDGE DEVICES VIA SOFTWARE KERNELS

(71) Applicant: Booz Allen Hamilton Inc., McLean, VA (US)

(72) Inventors: Raymond Charles Hardman, III, Oakton, VA (US); Ki Hyun Lee, McLean, VA (US); Tyler James Alston, Reston, VA (US); Rohit Leena Madhu, Fairfax, VA (US); Parisa Gandomkar Yarandi, Arlington, VA (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 0 days.

(21) Appl. No.: 16/596,337

(22) Filed: Oct. 8, 2019

(65) Prior Publication Data
US 2020/0112609 A1   Apr. 9, 2020

Related U.S. Application Data

(60) Provisional application No. 62/742,764, filed on Oct. 8, 2018.

(51) Int. Cl.
*H04L 29/08* (2006.01)
*H04L 12/707* (2013.01)

(52) U.S. Cl.
CPC .............. *H04L 67/12* (2013.01); *H04L 45/22* (2013.01); *H04L 67/1093* (2013.01)

(58) Field of Classification Search
CPC ...... H04L 67/12; H04L 67/1093; H04L 67/32
See application file for complete search history.

(56) References Cited

U.S. PATENT DOCUMENTS

2006/0143439 A1   6/2006   Arumugam et al.
2008/0258880 A1   10/2008  Smith et al.
(Continued)

OTHER PUBLICATIONS

Satyanarayanan, Madahev, Pieter Simeons, Yu Xiao, Padmanabhan Pillai, Zhuo Chen, Kiryong Ha, Wenlu Hu, and Brandon Amos, "Edge Analytics in the Internet of Things", 2015, IEEE, pp. 24-31. (Year: 2015).*

(Continued)

*Primary Examiner* — Nam T Tran
(74) *Attorney, Agent, or Firm* — Buchanan Ingersoll & Rooney PC

(57) ABSTRACT

A method and system are disclosed for acquiring and processing data, the exemplary system includes: one or more intelligent devices connected in a dynamic ad hoc network as a network of edge devices which can optionally access a cloud storage, at least one intelligent device being configured with a software installation to selectively receive and execute analytics on data received; at least one of the intelligent devices being configured to identify data to be requested from at least one other edge device for enhancing analytics performed on the at least one intelligent device; and a switchboard for maintaining a current view of resources in the network, and functions for which each resource is tasked, the resources including the at least one intelligent device and those edge devices which can communicate with the at least one intelligent device on the network.

11 Claims, 11 Drawing Sheets

(56) References Cited

U.S. PATENT DOCUMENTS

2017/0048308 A1* 2/2017 Qaisar .................... H04L 67/12
2017/0060574 A1* 3/2017 Malladi .................. H04L 67/12
2017/0279829 A1    9/2017 Vasseur et al.
2018/0145907 A1    5/2018 Vannithamby et al.
2018/0181868 A1    6/2018 Chew

OTHER PUBLICATIONS

Notification of Transmittal of the International Search Report and Written Opinion of the International Searching Authority (Forms PCT/ISA/220, PCT/ISA/210 and PCT/ISA/237) dated Jan. 7, 2020, by the International Bureau of the U.S. Patent and Trademark Office, in corresponding International Application No. PCT/US19/55205. (16 pages).

* cited by examiner

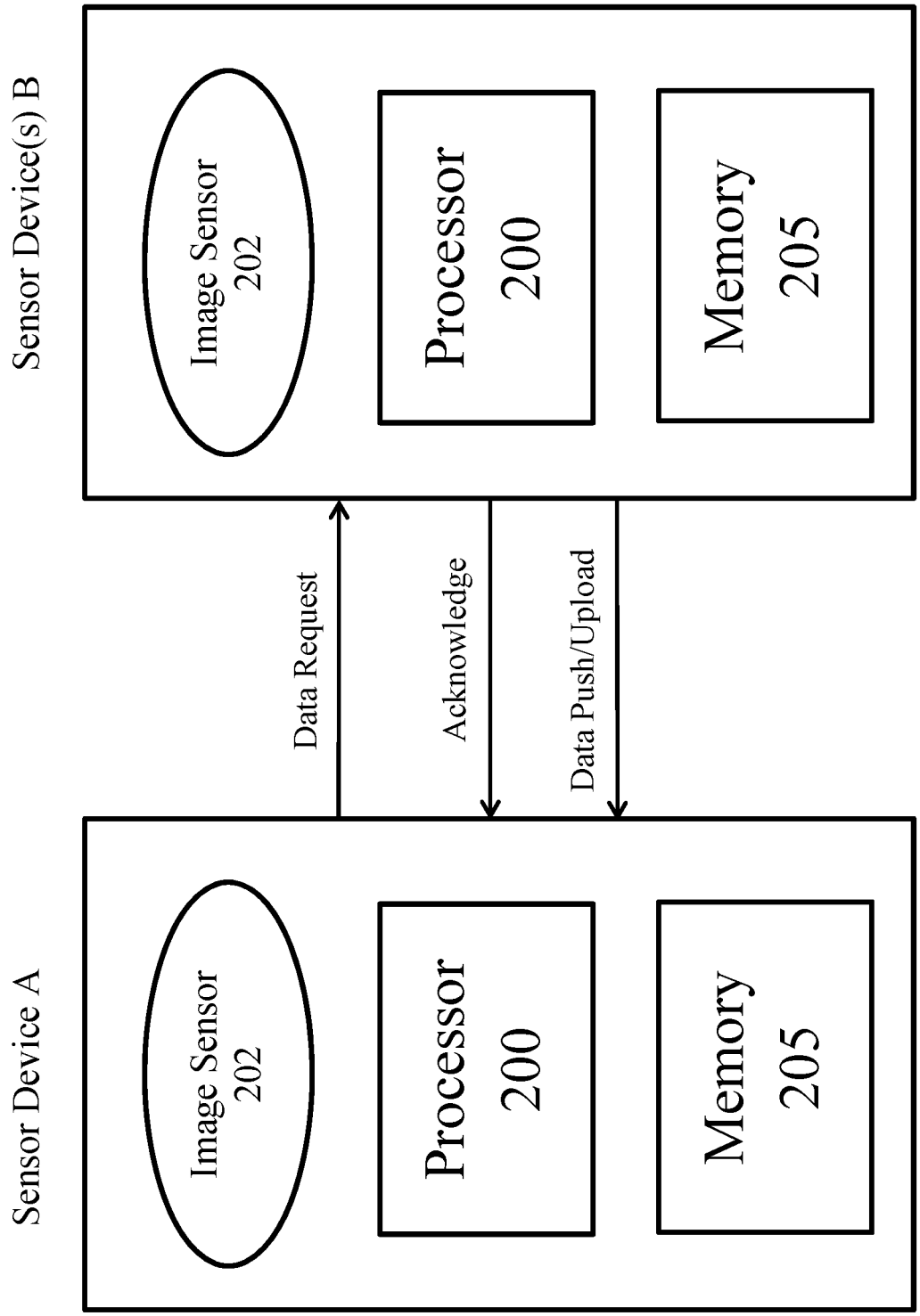

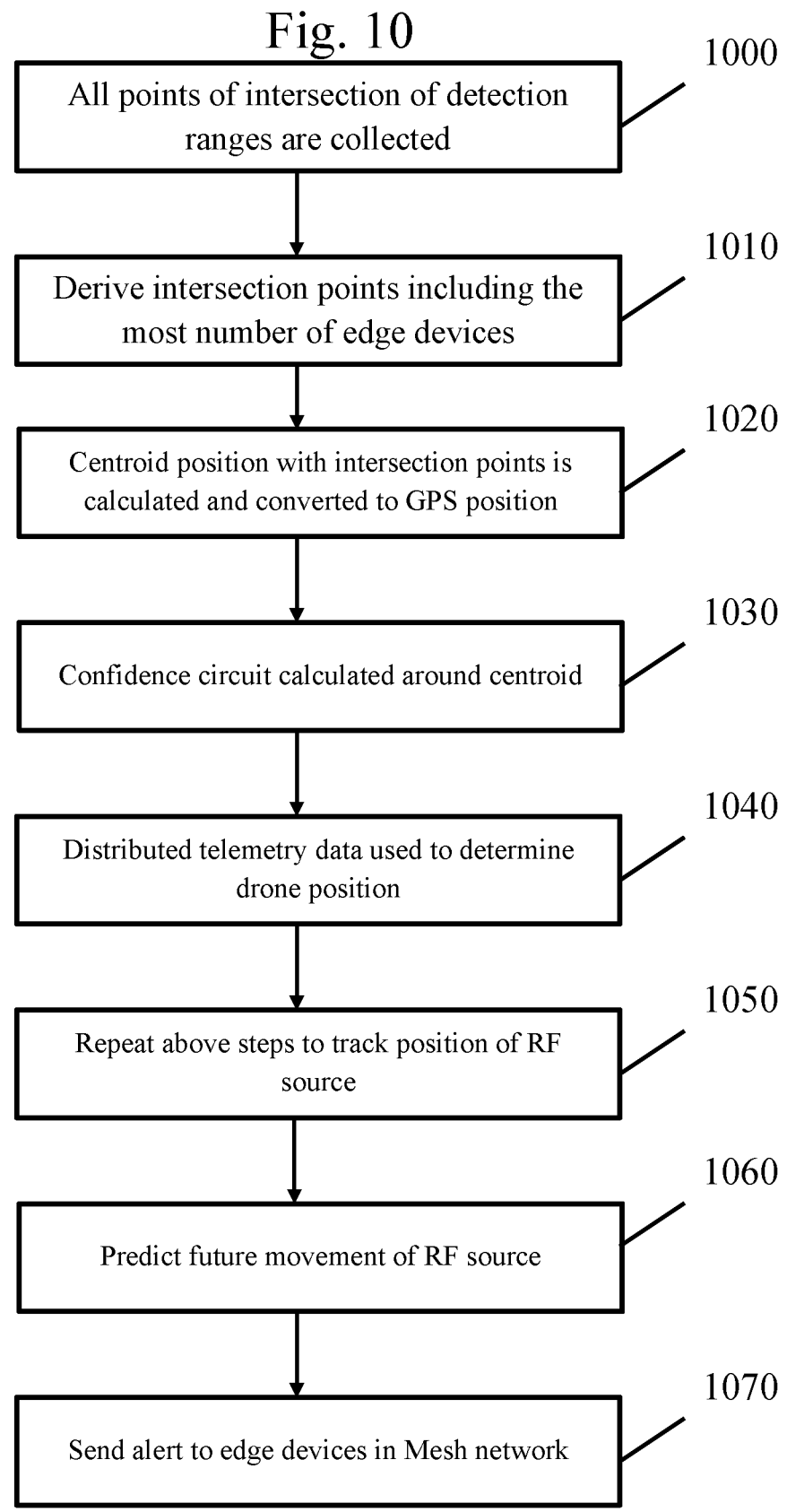

METHODS AND SYSTEMS FOR ACQUIRING AND PROCESSING DATA AT INTELLIGENT EDGE DEVICES VIA SOFTWARE KERNELS

FIELD

The present disclosure relates to methods and systems for acquiring and processing data at intelligent edge devices.

BACKGROUND INFORMATION

Internet of Things (IoT) technology includes over 25 billion devices collecting and processing data acquired from everyday user activities. This translates to approximately four (4) devices per person collecting data and the amount of collected data is projected to increase exponentially as innovation and the number of devices and the desire and need for data analytics increases. The collecting and processing of so much data, however, presents various infrastructure challenges for quickly handling the data. These challenges include, for example, sensors generating volumes of raw data that overload processing and/or storage devices. The surge in data collection and processing can result in the clogging of network bandwidths and data channels. The incompatibility and lack of standardization of sensors and their protocols leads to inoperability among devices and an inability to share information. In addition, implementations using cloud storage to collect large amounts of data can lead to long delays in processing and analysis. In other words, there can be considerable delay between when data is collected and acted upon.

As the need and desire for data processing and analytics grows, the problems facing the infrastructure designed to process the data will grow. A solution is needed to prevent or manage the bottleneck caused by processing requirements that have exceeded current infrastructure designs.

An example of a real-world impact of increased data collection requirements can be found in the following military application. In the past, troops would report positions to an operations center. The operations center would provide instructions on the next movement based on current intelligence obtained from manual sources. This manual-centric approach has been replaced with the current, more automated approach where troops are equipped with GPS trackers and intelligent devices that report location information back to the operation center which then informs the troops where to move based on current intelligence collected via unmanned aerial vehicles (UAVs) and other intelligence sources. In the future, troops may be equipped with warfighter devices that interoperate to inform the operations center and the troops of current activities and locations. The interoperable warfighter device combined with expeditionary mesh networks used by UAVs will inform troops how to stay safe without the need to communicate directly with the operations center. The warfighter system will provide real-time communication among multiple troop units.

Integrated communications can also be implemented in consumer services such as hailing or reserving a taxi. In the past, hailing a taxi required calling a taxi service and reserving transportation via an agent. Currently, ride hailing services allow a consumer to reserve transportation using an app on a mobile phone. In the future, integrated communications and data transfer among devices will allow users to automate receiving services such as transportation based on indirect triggers such as paying for dinner via a credit card.

A differentiator between this system and cloud-based systems that push compute to the edge (Greengrass) is a mobile edge device node capability that renders the edge device network, amorphic (e.g., dynamic ad hoc) and self-contained (autonomous, in that it does not rely on external logic for networking functions such as storage or processing). Exemplary embodiments of this system, unlike cloud-based systems, push data computations to the edge where the edge is a network of mobile, amorphic, and self-contained nodes that can perform data analytics without cloud access.

SUMMARY

A method and system are disclosed for acquiring and processing data, the exemplary system comprising: at least one intelligent device configured to connect to a network of edge devices or nodes which can optionally access a cloud storage, the at least one intelligent device being configured with a software installation to selectively receive and execute analytics on data received by the network; the at least one intelligent device being configured to identify data to be requested for enhancing analytics performed on the at least one intelligent device; and a switchboard for maintaining a current view of resources with which the at least one intelligent device can communicate on the network and functions for which resources connected to the network are tasked, the resources including the at least one intelligent device, any other intelligent devices, edge devices, and nodes.

A method is disclosed for acquiring and processing data, the system comprising: connecting one or more intelligent devices in a dynamic ad hoc network as a network of plural edge devices which can optionally access a cloud storage, the at least one intelligent device being configured with a software installation to selectively receive and execute analytics on data received; configuring at least one of the one or more intelligent devices to identify data to be requested from at least one other edge device on the network for enhancing analytics performed on the configured at least one intelligent device; and maintaining a switchboard for a current view of resources with which the at least one intelligent device can communicate on the network and functions for which each device on the network is tasked, the resources including the at least one intelligent device and the at least one other edge device.

A system for acquiring and processing data, the system comprising: one or more intelligent devices configured to connect to a dynamic ad hoc network as one or more edge devices of the network which can optionally access cloud storage, at least one first intelligent device of the one or more intelligent devices being configured with a software installation to selectively receive and execute analytics on data received; at least one second intelligent device of the one or more intelligent devices being configured to identify data to be requested for enhancing analytics performed on the at least one first intelligent device; and a switchboard for maintaining a current view of resources with which the at least one first and one second intelligent device can communicate on the network and functions for which the resources are tasked, the resources including the at least one first and one second intelligent devices, other intelligent devices of the one or more intelligent devices, and any of the edge devices.

BRIEF DESCRIPTION OF THE DRAWINGS

Other objects and advantages of the present disclosure will be realized from the following description of exemplary preferred embodiments when read in conjunction with the drawings set forth herein.

FIGS. 3A and 3B illustrate exemplary data transfer operations between intelligent sensor devices in an edge detection system in accordance with an exemplary embodiment of the present disclosure.

FIG. 10 illustrates a method for estimating a position of an originating signal in a DOME edge detection system in accordance with an exemplary embodiment

DETAILED DESCRIPTION

The Smart Edge Framework allows a group of devices (e.g., edge devices on a cloud periphery) to share compute, communication, and storage resources over an amorphic (e.g., dynamic, ad-hoc mesh) network to perform advanced analytics on a combined array of data from distributed sensors as one large sensing and compute system. This framework is a software installation package or kernel that can be installed on a variety of hardware platforms (e.g., ARM, x86, etc.) and operating systems (e.g., Android, iOS, Linux, Windows). It leverages a distributed compute and storage model that provides functionality in an environment where connectivity is limited or unavailable.

Compute functions and calculations are performed locally at the edge device that collects information/data from the sensors. Onboard capabilities can combine data and computed information from multiple devices to perform calculations. The devices can share and combine data and computed information from multiple devices in the mesh network to perform calculations. This functionality remains as long as the devices can still connect to one another (e.g., without relying on the cloud or direct or indirect communication). This framework can include an ability to provide connectivity between devices via a Mesh Networking layer that can respond to changes in the types and quality of connections available (e.g., BLE, Wi-Fi, LPWAN, UWB, 3GLTE, Satellite, Tactical Radio, etc.).

Figure 1:
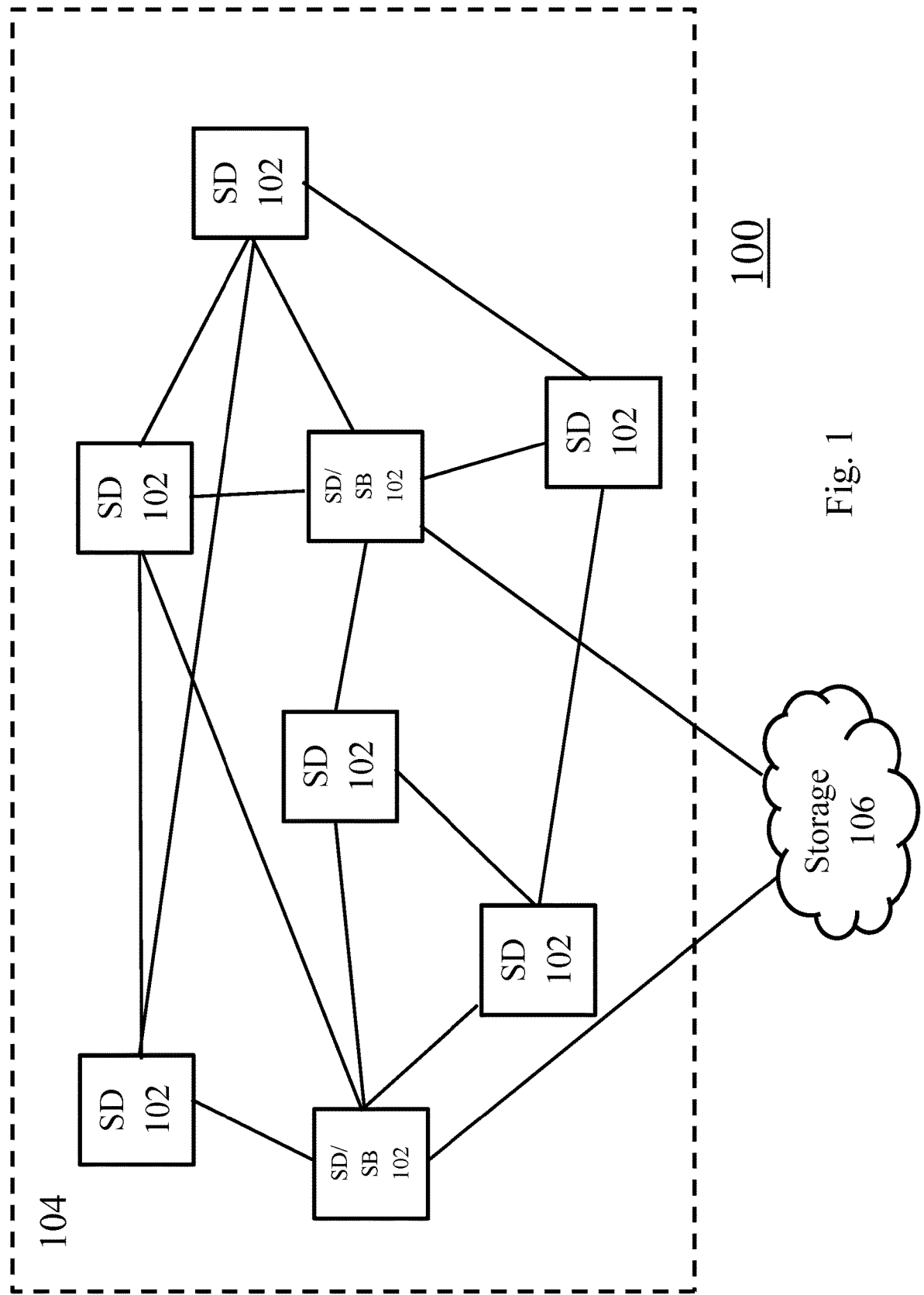
FIG. 1 illustrates a system for acquiring and processing data according to an exemplary embodiment of the present disclosure.
Figure 2:
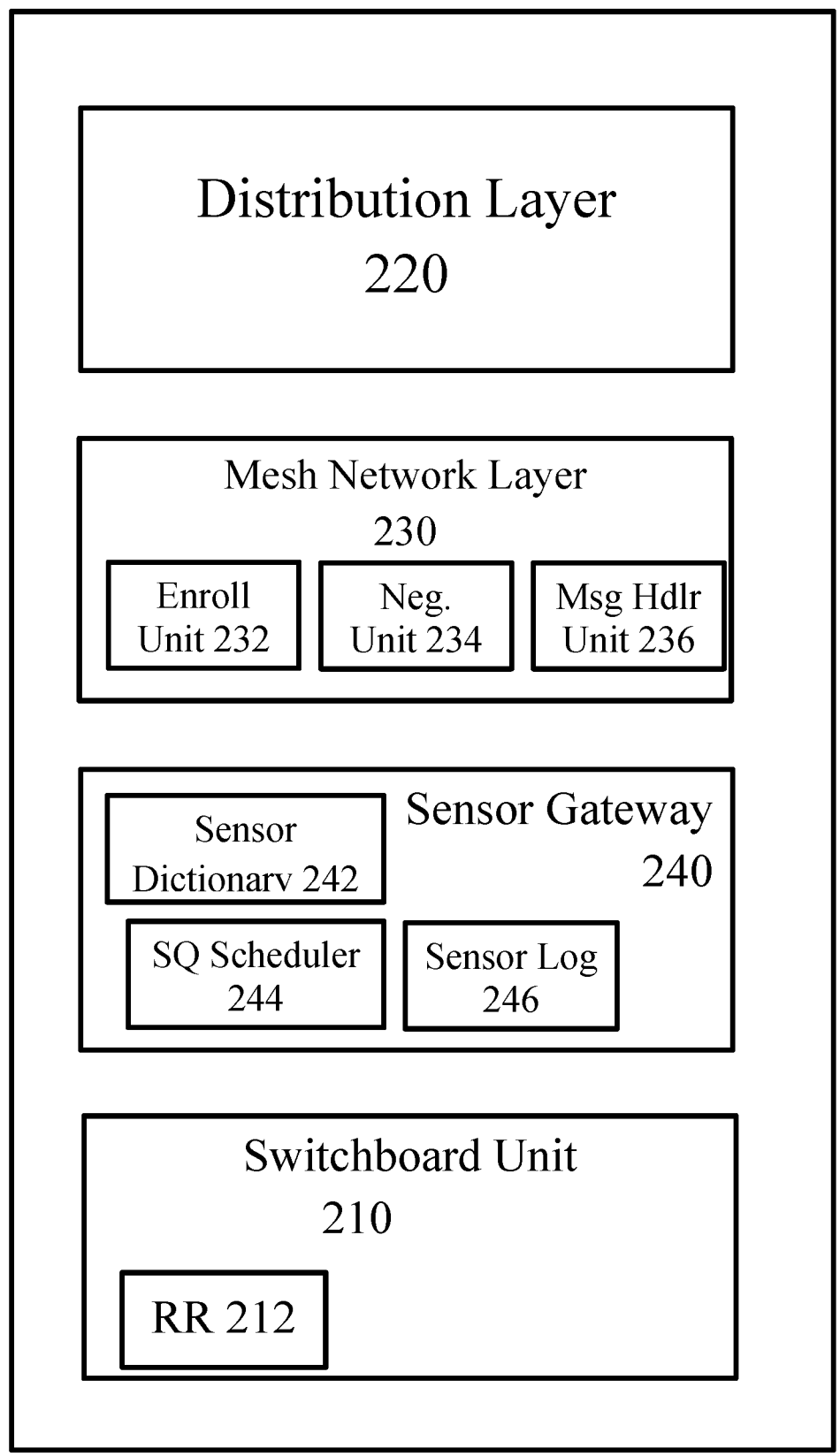
FIG. 2 is a block diagram of an exemplary intelligent sensor device in accordance with an exemplary embodiment.

FIG. 1 illustrates a system for acquiring and processing data according to an exemplary embodiment of the present disclosure. The system 100 includes one or more intelligent sensor devices (SD) 102 (e.g., a sensor itself, or a device with access to a sensor) connected in a dynamic ad hoc network as a Mesh Network 104 of edge devices which can optionally access a cloud storage network 106, each intelligent sensor device 102 being configured with a software installation to selectively receive and execute analytics on data received. Each intelligent sensor device 102 is also configured to identify data to be requested for enhancing analytics performed at or on the at least one intelligent sensor device. FIG. 2 is a block diagram of an exemplary intelligent sensor device in accordance with an exemplary embodiment. As shown in FIG. 2, each of the intelligent sensor devices 102 can include a processor 200, a sensor 202, and memory 205. The processor 200 and/or memory 205 can be encoded with a distribution layer 220, a mesh network layer 230, and a sensor gateway 240. One or more of the intelligent sensor devices 102 has a processor 200 and/or memory 205 further encoded with a switchboard unit 210.

Switchboard Unit 210

The switchboard unit 210 is a type of registry (e.g., resident in memory of one or more nodes, and/or maintained in a distributed set of edge device and/or other nodes) that stores information about the devices 102 participating in the Mesh Network 104 including available communication paths/protocols and on broad functions (e.g., sensor modules). The Distribution Layer 220 (where advanced analytics and cross device communications originate) references this registry to understand information about each device. For example: which device can perform which function, what capabilities they are performing or subscribed to, and/or their state (e.g. battery, CPU load, etc.). As a device installs on the Mesh Network 104 and configures a Smart Edge Framework (SEFW), information can be captured in a Replicated Registry (RR) 212 of the switchboard 210. As it enrolls in the Mesh Network and begins communicating with other devices, it reports on this registry and begins to populate the registry 212 with information of the other devices in the Mesh Network 230. As the information in the registry 212 changes, updates are processed and communicated through the Mesh Network 230 among the edge devices 102 and, if desired, to a central location within or outside the cloud 106 as backup.

Examples of information that can be contained within the registry 212 include:
Globally Unique Identifier;
Hardware local to each sensor device 102.
  e.g., CPU, GPU, RAM, total storage, networking and communications adapters, Input and Output devices, local sensors;
Software presently installed;
ML/AI packages and plugins loaded;
Connected sensor devices 102;
Currently running processes;
Subscribed processes; and
All state information
  e.g., CPU and RAM utilization, remaining battery, available storage.

It should be understood that the aforementioned list of items in the registry is not exhaustive or definitive as the registry 212 can include different or additional information as desired for a particular application or to achieve a desired objective.

Distribution Layer Unit 220

As shown in FIG. 2, the sensor device 102 is also encoded with a distribution layer 220, which stores and runs the analytics functions (capabilities) of the sensor device 102. Capabilities include for example, any type of mathematically related operation (e.g., Artificial Intelligence, Machine Learning inferences, or algorithms). The storage of the capabilities can be implemented using a modular plug-in model. Updates to capabilities can be performed without requiring the reinstallation of the SEFW. This also supports running multiple capabilities simultaneously. This model allows for a manufacturer of specific, single purpose sensing devices and applications to simply create a plugin (e.g., application program interface (API)) for their sensor devices 102.

These capabilities request sensor data from the Sensor Gateway, which polls sensors for data and stores the data in an associated sensor log. One device may request logged sensor data from another device via the Mesh Network 230 message handler.

Some capabilities can include leveraging distributed processing of physically remote sensor data to perform data analytics that provide an understanding of the environment not available from a single device's point of view. This can be done in the cloud currently by having edge devices perform preprocessing and pass the resulting information to central processing. However, in exemplary embodiments disclosed herein, combined processing happens on the edge devices. The edge devices can share data and analytic processing capabilities over their Mesh Network Layer 230, including their processed and unprocessed sensor data, for combining this information for final processing. Information can be selectively pushed to or pulled from other edge devices of the network 104.

According to an exemplary embodiment of the present disclosure, one sensor device (e.g., an edge device) can be configured to leverage the sensors and sensor data of another sensor device (e.g., another edge device) to create functionality greater than that which can be performed by a single sensor device or separately by both sensor devices. FIG. 3A illustrates an exemplary embodiment of a Computer Vision capability in a first sensor device (Sensor A) that receives image data from one or more second sensor devices (Sensor B). The first sensor device (Sensor A) and second sensor device(s) (Sensor B) can have different fields of view or observational perspectives of a desired area, signal, or object that is detected or under surveillance. As shown in FIG. 3A, the first sensor device (Sensor A) can send a data request to the second sensor device(s) (Sensor B). The second sensor device(s) (Sensor B) initiates a data push operation, data transmission, or data upload to the first sensor device (Sensor A). It should be understood that any suitable manner, scheme, or format can be used to communicate data between the first and second sensors. In performing image processing across multiple sensor devices (e.g., edge devices), the field of view of each sensor device 102 can be enhanced such that improved data analytic results can be provided to a user over the image analysis by just one sensor. Each sensor device 102 can be configured to perform modular analytics in which a suite of analytic tools across multiple devices can used to perform data analytics.

Figure 3B:
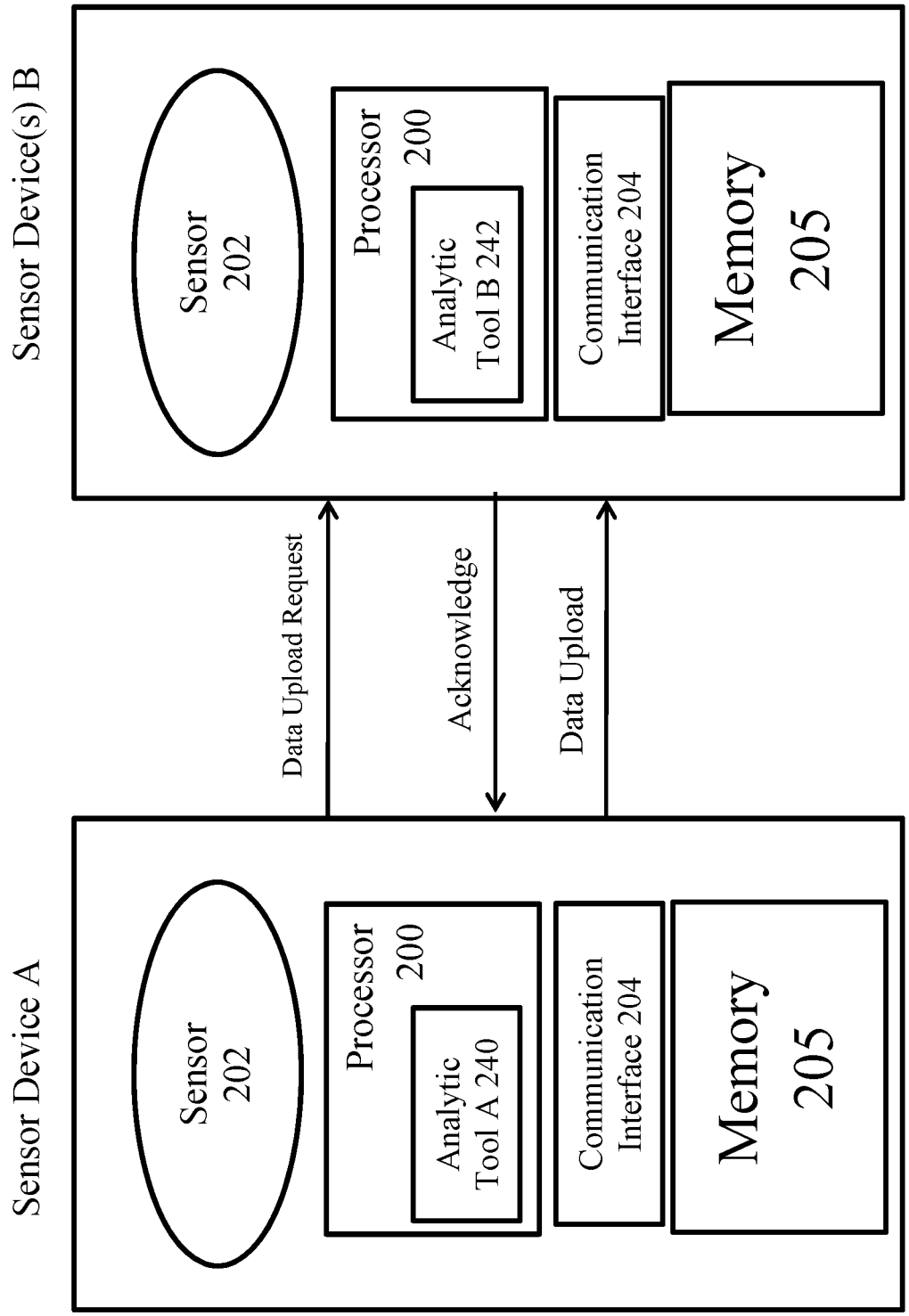

FIG. 3B illustrates an exemplary embodiment in which one sensor device can be configured to perform data analytics on sensor data using a first analytic tool (A) 240 and transfer processed or unprocessed sensor data to another sensor device for performing data analytics using a second analytic tool (B) 242. When the first and second analytic tools 240, 242 are different, the first sensor device can send the sensor data to another sensor device for obtaining a different analytic solution. Still further, the second analytic tool (B) 242 could be the same tool as the first analytic tool (A) 240 by which the two devices can process the sensor data in parallel. This aspect of modular analytics can be especially useful when a large amount of sensor data is to be processed. In this instance, a first sensor device can offload a portion of the sensor data to another sensor device to increase the speed and efficiency of data processing. According to another exemplary embodiment, one device can also request a Sensor Dictionary (discussed in detail below) update from another device via this layer to allow for improved, expanded, or new processing capabilities. Numerous other examples (e.g., communications software) will be apparent to those skilled in the art.

The distribution layer unit 220 can allow Machine Learning (ML) packages to be moved locally among sensor devices without going to the cloud 106. The kernels in the edge devices share information and make determinations collectively rather than going back to the cloud. For example, the sensor devices 102 can determine the workload share amongst a plurality of edge detection devices and whether some sensors should bear more or less of the workload than others.

Mesh Network Layer Unit 230:

Each sensor device 102 can also have a processor 200 and/or memory device 205 encoded with a mesh network layer 230, which is used to connect participating sensor devices 102 (e.g., edge devices) to one another. The mesh network layer 230 also provides a conduit enabling a sensor device 102 to connect to remote sensors and have new capabilities loaded from remote sources.

Enrollment:

The mesh network layer unit 230 layer can be configured to include an enrollment unit 232 which performs health checks, and message communication between sensor devices 102. The enrollment unit 232 can be configured to leverage authentication and authorization mechanisms for allowing access to the mesh network 104. The enrollment unit 232 allows for personal management software to be accessed by the subject sensor device or another connected sensor device so that any device and user on the mesh network 230 can be validated before accessing data from other enrolled devices.

Negotiation:

The mesh network layer unit 230 can be configured to include a negotiation unit 234 which performs negotiations with other sensor devices 102 on the network. As the network connections at each sensor device change, these updates can be monitored and stored. For example, during a network connection change, devices can move outside of communication range for a specified network connection, or the current connection can be lost due to a network error. Either circumstance results in a need for a connection change. The negotiation unit 234 can be configured to implement a connection change by determining which connectivity paths are accessible. According to an exemplary embodiment, communication data analytics can be performed (e.g., administrative route costs combined with a Graph Database) to determine optimum routes between different devices when there are more than one connection type and route. According to an exemplary embodiment, the sensor devices 102 can be connected to communicate over ultra-wideband (UWB), Bluetooth low energy (BLE), Wi-Fi, and third generation long term evolution (3G LTE) signaling schemes, or any other suitable communication protocol as desired. The communication data analytics can be performed to evaluate the bandwidth needs of the communication (small, fast, short range packets over BLE versus large, fast, medium range packets over point-to-point Wi-Fi). The analytics select the better or preferred network connection, which can lead to reduced battery usage as well as reduction in the electromagnetic signature emitted by the participating sensor devices (e.g., edge device nodes).

Message Handler:

The mesh network layer 230 can be configured to include a message handler unit 236, which handles packetizing and serializing communications between sensor (e.g., edge) devices 102. The message handler unit 236 is also configured to handle tagging of data and communications so that a sensor device, which sends information, includes in the transmission the metadata needed by the receiver sensor device for processing the information package and sending the received data to the correct component. For example, a first sensor device 102 can tag a sensor request to a second sensor device 102 so that the request would be handled by the second sensor device's Sensor Gateway unit 240. The return message from the second sensor device would contain the tagging appropriate for the first sensor device to understand that this package was in response to its request.

The mesh network layer unit 230 leverages the connectivity available to one respective sensor device to other devices connected on the network 104 for direct and indirect communication of data and signals. The mesh network layer unit 230 allows different types of connectivity paths to be chosen based on the types of data and functionality to be performed, e.g., high-bandwidth vs low-bandwidth, etc. The proper connectivity can be selected based on availability and need, including whether communication to cloud storage, the mesh network, or other suitable communication medium or platform is specified.

Sensor Gateway Unit 240:

A sensor device 102 having a processor or memory encoded with the sensor gateway unit 240 is configured to allow for the processing of sensor data for data analytics. According to an exemplary embodiment, the sensor device 102 is configured to access the sensor data of other sensor devices on the network and is configured to standardize its own sensor data for access by other sensor devices for data analytics. This functionality allows each sensor device 102 (e.g., node) to connect to and access a variety of sensors through a variety of connection methods. As such, the processing logic for each sensor is agnostic with respect to the data format of other sensors connected on the network 104.

For example, through the sensor gateway unit 240 a sensor device 102 (e.g., node) can be configured to connect to the mesh network 230 and/or other sensor devices 102 via local wired, Bluetooth wireless, and network accessible, low-power wide area network (LPWAN), free space optics, or any other connection type supported by the node hardware (e.g., processor, memory, etc.) on which the framework is installed. Each sensor device 102 operating as an edge device may access sensor data that is local to another device via the mesh network 230.

Sensor Dictionary 242:

The sensor gateway unit 240 can be configured to include a Sensor Dictionary 242, which serves as an onboard database (DB) to track which sensor devices 102 are available and to store information on how each available sensor device is configured to communicate on the mesh network 230. For example, the sensor dictionary can include information which defines one or more communication protocols or standards used, e.g., message formatting, etc. According to exemplary embodiments of the present disclosure, the Sensor Dictionary 242 can be resident on each individual sensor device 102 or shared across one or more sensor devices operating as edge devices with a central designated storage within the mesh network 230. For example, a user may have three different accessory sensor devices 102 capable of reading or monitoring heart rate (HR) (e.g., Android watch, Fitbit, Apple watch, or any other personal electronic HR reading or monitoring device). The sensor dictionary 242 can configure the sensor device 102 to prioritize the HR sources, by first attempting to obtain HR data from the Fitbit, then secondly the Android watch, and thirdly the Apple watch. In this manner, the capability logic that is running that needs HR data does not have to be programmed for specific devices. It simply knows that there is an HR device available to be queried. This information is updated into the Distributed Registry 212 in the Switchboard Unit 210. There in a sensor enrollment process in the system that allows the user to add new sensors to the system and set the priorities of the sensors.

Scheduler 244:

The sensor gateway unit 240 can also be configured to include a Sensor Query Scheduler 244. Looking again at the HR monitoring example, the HR monitoring sensor device can have several capabilities (e.g., functions), which all require polling data to be obtained from the sensor device 102. The Sensor Query Scheduler 244 can be configured to query the HR sensor for data according to a specified schedule. Any data obtained from the sensor device as a result of the query can be logged into a sensor log 246. The Sensor Query Scheduler 244 provides efficiencies for data acquisition as it would be inefficient if two different capabilities of the HR sensor device were to query the sensor at the same time. Under scheduling, Capability 1 of the HR sensor device can be queried every 5 seconds, while Capability 2 can be queried every 10 seconds. Without scheduling management, the HR sensor device could be queried three times every 10 seconds rather than twice.

The Sensor Gateway unit 240, when Capability 2 of the HR sensor device is initiated, is configured to check the Sensor Query Scheduler 244 to determine if a scheduling conflict exists with querying another capability. If, for example, a conflict does exist, the Sensor Gateway unit 240 can determine to disable Capability 1 while Capability 2 is still running. As a result, the scheduling feature ensures that once every 10 seconds query needed by Capability 2 remains.

Figure 4:
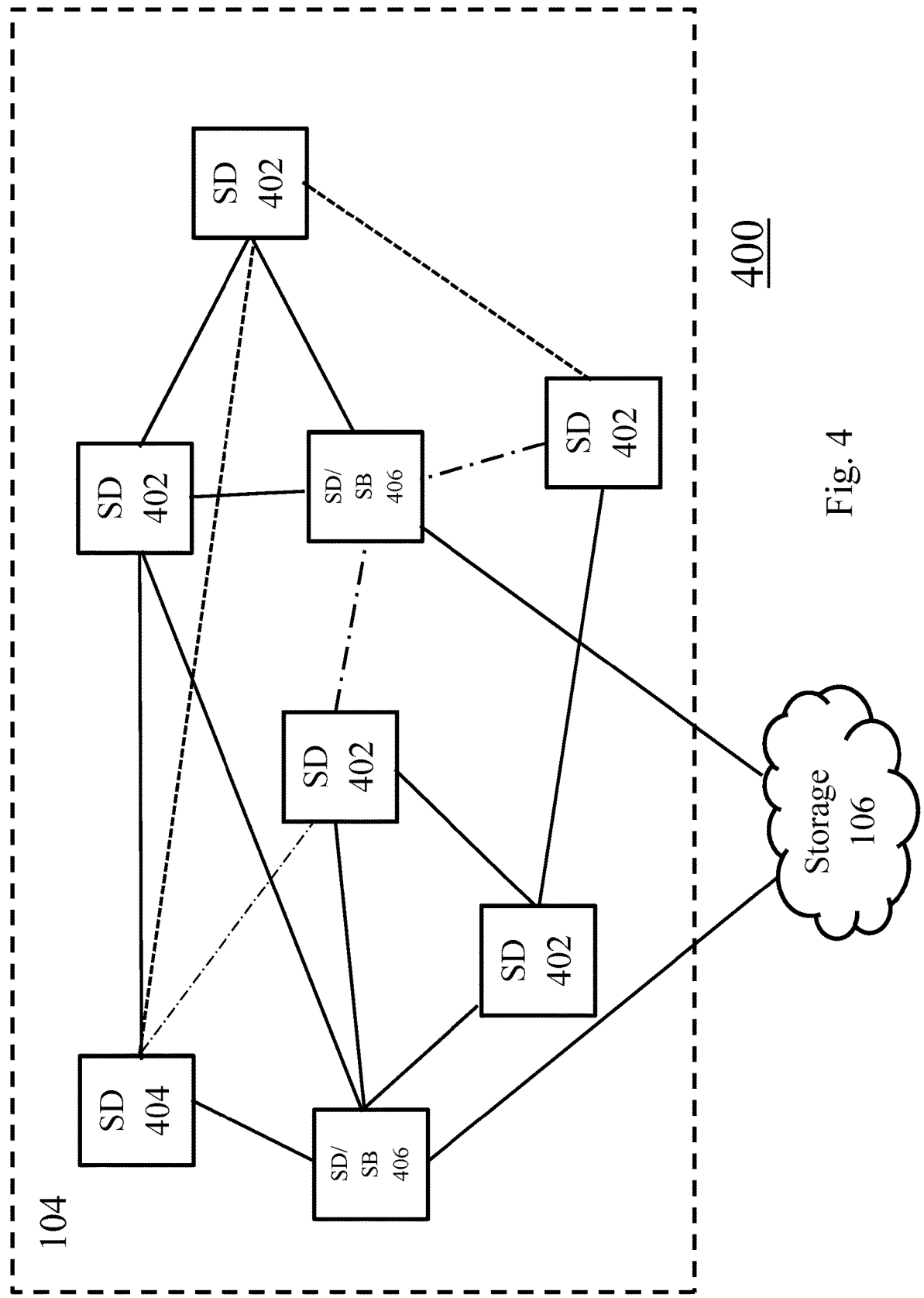
FIG. 4 illustrates an exemplary edge detection system in accordance with an exemplary embodiment of the present disclosure.

FIG. 4 is a diagram illustrating an exemplary edge detection system 400 in accordance with an exemplary embodiment of the present disclosure. As shown in FIG. 4, one or more of the intelligent sensor devices 402, 404, 406 is configured to identify data to be requested from one or more other sensor devices 402, 404, 406 for enhancing analytics performed on the one or more intelligent sensor devices. Intelligent sensor devices 406 include a processor and/or memory device encoded with a switchboard unit 210 for maintaining a current view of resources in the network 104, and functions for which each intelligent sensor device 402, 404 is tasked, the resources including sensor devices which can communicate directly with one another at any given time. The intelligent sensor devices 402, 404, 406 are configured to select one of plural transmission paths 112 having characteristics (e.g., bandwidth) suitable for transmitting results of the analytics performed at one or more of the sensor devices. In forming the dynamic ad hoc (e.g., mesh) network 104, the sensor devices 402, 404, and 406 can establish a mesh network in which the sensor devices operate as edge detecting devices that dynamically connect in ad hoc fashion when in range of one another. Each sensor device 402, 404, 406 can be configured to use the mesh network layer unit 230 to identify other available sensor devices on the network 104 and perform one or more of the enrollment, negotiation, and messaging processes to establish a most efficient path for data processing and communication. One or more of the sensor devices 402 can be configured to be resilient (e.g., configured to dynamically change a selected communication path 112 for transmitting information to or receiving information from a second sensor device 404, such as the results of onboard analysis, such that the channel and/or communication format are selected based on the bandwidth demands of the information to be transmitted or received) in establishing alternate communication paths 112 as a function of dynamic changes in the network 104.

The one or more sensor devices 406 configured to include a switchboard unit 210 can keep track of available characteristics (e.g., paths, formats, bandwidths) of communication and select an appropriate characteristic for a current situation, environment, and function of a given edge device to receive or transmit information. For example, the sensor device 406 switchboard unit 210 can identify the capabilities of each sensor device 402, 404 and select those edge detecting (e.g., sensor) devices having the specific capabilities for performing the data analysis. According to an exemplary embodiment, the sensor device 406 can identify and select plural edge detecting devices for performing modular analytic processing. The sensor device 406 can send a control signal to one or more edge detecting devices 402, 404, 406 for transfer of all or a portion of their sensor data to another edge detecting device for processing. As a result of at least the modular analytic processing, the edge devices 402, 404, 406 can work together in a manner that makes the whole of the edge devices greater in function than the individual edge devices separately in function (the whole is greater than the sum of the parts), and the edge detection devices 402, 404, 406 can process data and coordinate actions across meshed nodes.

According to an exemplary embodiment, the edge detection system of FIG. 4 can be configured according to an RF "Sniffer" application for locating origins of RF transmissions, such as RF transmission of drones. In this example, 5 phones can be running RF scanners via USB and pass info to one another by a Bluetooth mesh network. The edge detecting device 406 configured to include the switchboard unit 210 keeps track of the other edge detecting devices 402, 404 and their respective statuses. Each edge detecting device 402, 404 monitors (e.g., "sniffs) the environment and/or appropriate RF bands for RF signals. At each edge detecting device 402, 404 signals can be pre-processed using appropriate algorithms and equations to generate a sensor location of detected RF signal characteristics. Using the mesh network layer unit 230, the respective edge detection device 402, 404 can select an appropriate communication format or transmission protocol based on transmission bandwidth requirements, and the edge detecting device 402, 404, 406 uses the selected communication format or protocol to send initial package info to other devices. Each edge detecting device 402, 404, 406 can processes and/or transfer the sensor data for final processing at a collective level and the resulting data, including sending message, can be transmitted via a best available method (e.g., communication path/format) as determined by each edge detection device 402, 404, 406, and such determination can be continuously updated and enhanced based on experience using AI or ML.

The one or more edge detecting devices on the network can run on any one of a number of mobile platforms such as Android, and need not rely on connectivity to the cloud 106 for a specific application or implementation. The location of a software install at an edge detection device 402, 404, 406 can use onboard AI to process information and coordinate with other devices on the edge (i.e., distributed computing).

Figure 5:
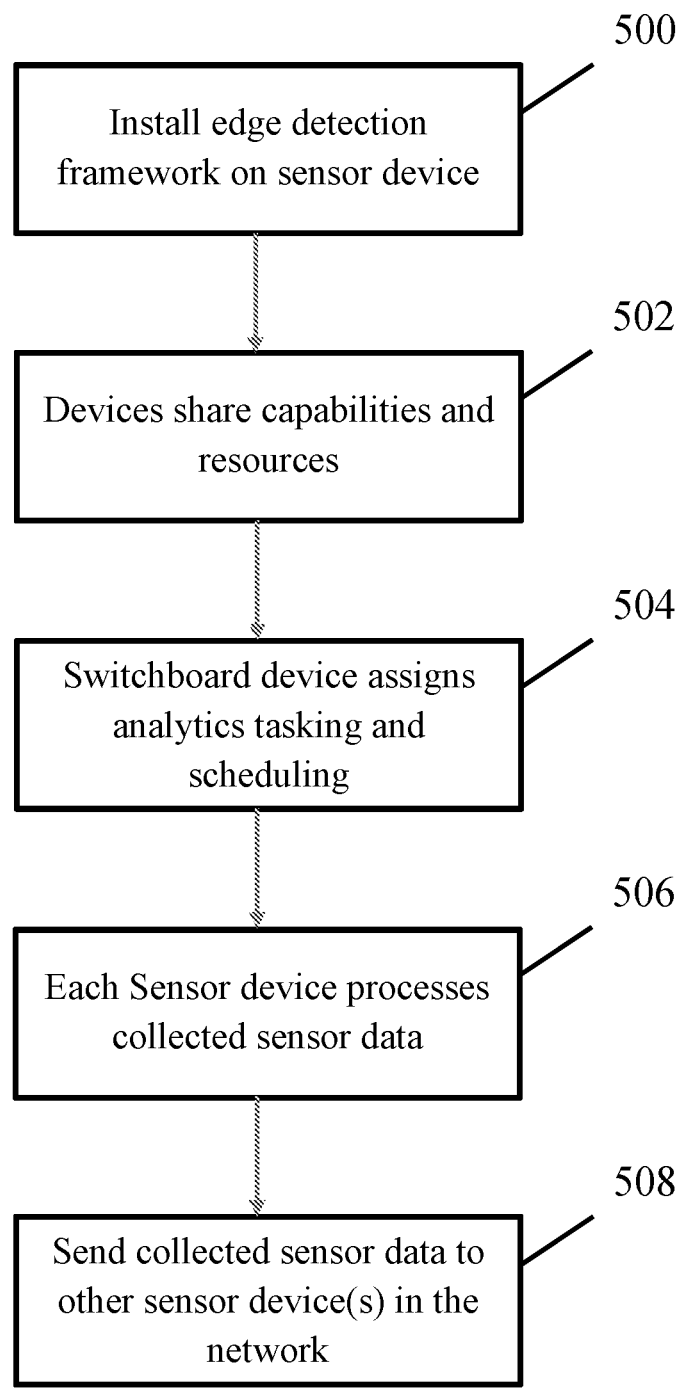
FIG. 5 illustrates an exemplary edge detection method in accordance with an exemplary embodiment of the present disclosure.

Exemplary embodiments couple edge-based AI with resulting actions that are done without hub input or determination. Workflow:

FIG. 5 illustrates an exemplary edge detection method in accordance with an exemplary embodiment of the present disclosure. As shown in FIG. 5, a group of hardware devices can have the edge detection framework installed as a software package (Step 500). For each hardware device a processor and/or memory device can be encoded with the software for executing the edge detection framework. The software package leverages the various networking and communications adapters local to the devices to establish an ad-hoc mesh network between the devices. Over this mesh network, the devices share (e.g., communicate) information about what resources each device has access to and what capabilities they each have (Step 502). With this knowledge of capabilities throughout the mesh network 230, analytics tasking can be assigned to devices for processing of sensor data both local to the processing and remote (Step 504).

Each sensor device 402, 404, 406 can process its sensor data as it is collected (Step 506). For example (not all-inclusive), the processing includes running Artificial Intelligence, Machine Learning inferences, or algorithms. This information can then be presented locally at the sensor device via screens, sound, or haptic feedback.

The information can also be formatted as information packages that are sent to other devices in the mesh network 104 that have the framework installed, external subscribers without the framework installed, and transferred to other software and hardware applications local to the device (or to external devices, or even to the cloud if desired) (Step 508).

This passing of messages is based on the configuration of the capability but supports various methods (e.g., a subscription/publish model, direct message with delivery guarantee, etc.).

When passing information packages via the mesh network 104, the algorithms in the framework evaluate the information package attributes as well as the transfer capabilities of the available networking and communications components. A sensor device 402, 404, 406 (e.g., edge device) selects the most appropriate communication method based on the specific capability and need at the time. For example, small packages (like GPS position information) that need to be shared between two devices that are relatively close to one another could have the data transmitted via Bluetooth Low Energy. As the two devices move further away, the system would automatically switch to Wi-Fi and then to Cellular. The mesh network 104 supports multi-node transfer.

Figure 6A:
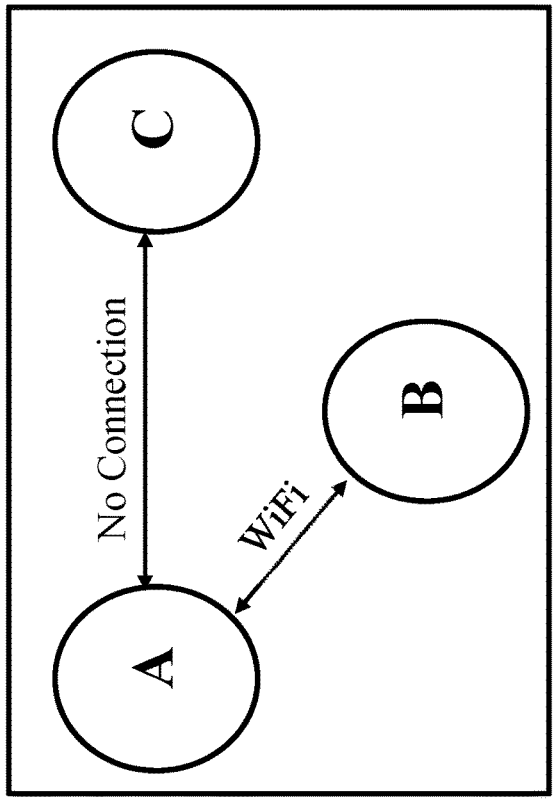
FIGS. 6A-6C illustrate a first multi-node transfer in accordance with an exemplary embodiment of the present disclosure.
Figure 6B:
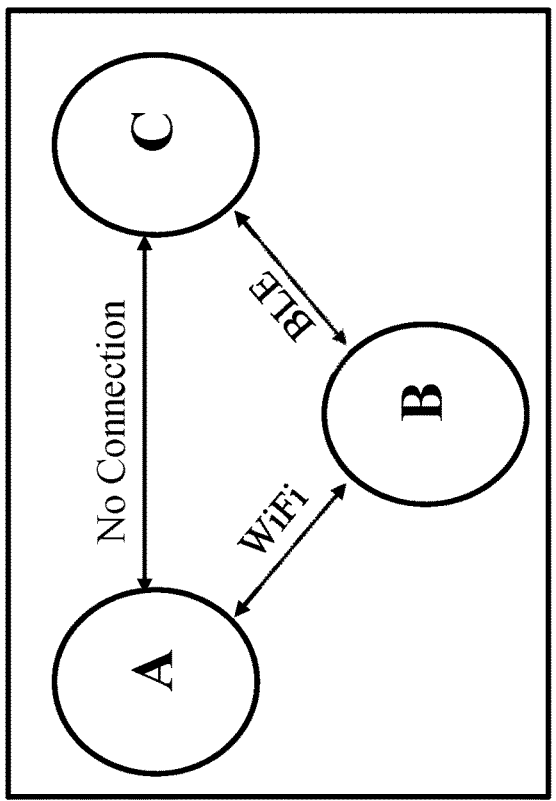
Figure 6C:
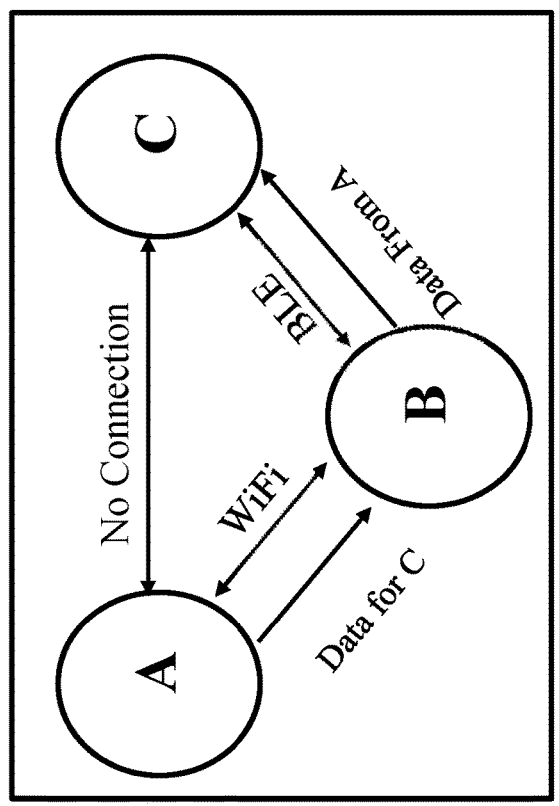

FIGS. 6A-6C illustrate a first multi-node transfer in accordance with an exemplary embodiment of the present disclosure. As shown in FIG. 6A-6C:

Nodes A and B can communicate via Wi-Fi (FIG. 6A),
Nodes A and C are too far apart to be connected (FIG. 6A).
Nodes B and C can communicate via close, low-energy BLE (FIG. 6B).
Node A can pass a message to Node C via Node A's communication path to Node B and Node B's communication path to Node C (FIG. 6C).

FIGS. 6A-6C are based on the system 300 illustrated in FIG. 3, which uses a Graph Database to monitor these communication paths and evaluate them for the least administrative cost.

Figure 7A:
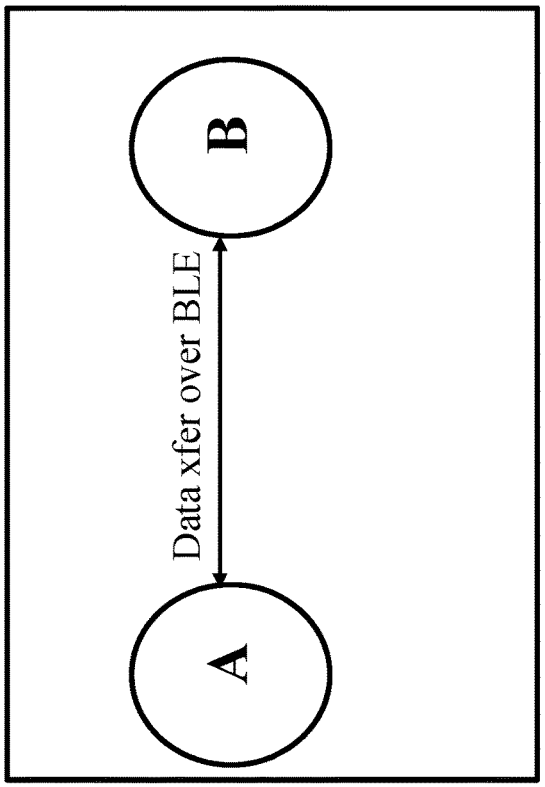
FIGS. 7A-7C illustrate a second multi-node transfer in accordance with an exemplary embodiment of the present disclosure.
Figure 7B:
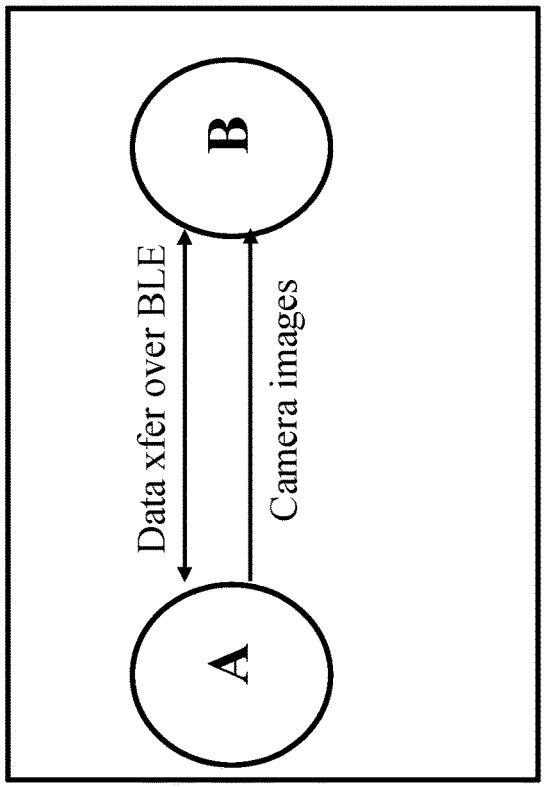
Figure 7C:
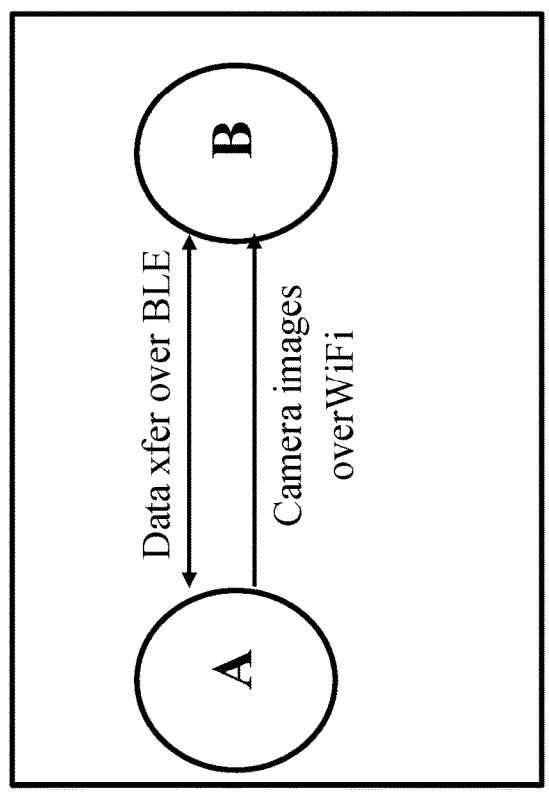

FIGS. 7A-7C illustrate a second multi-node transfer in accordance with an exemplary embodiment of the present disclosure. As shown in FIG. 7A, nodes A and B are participating in a capability that requires sharing small packages of information over low bandwidth. So, the system auto-selects BLE. While performing the capability, Nodes A and B start performing an additional capability that requires sending larger packages of information, such as camera images, with higher bandwidth requirements (FIG. 7B). For example, Node A is sending imagery to Node B for computer vision processing. As shown in FIG. 7C, the system enables Wi-Fi communication path to pass the larger files while maintaining the previous BLE communication path.

Figure 8:
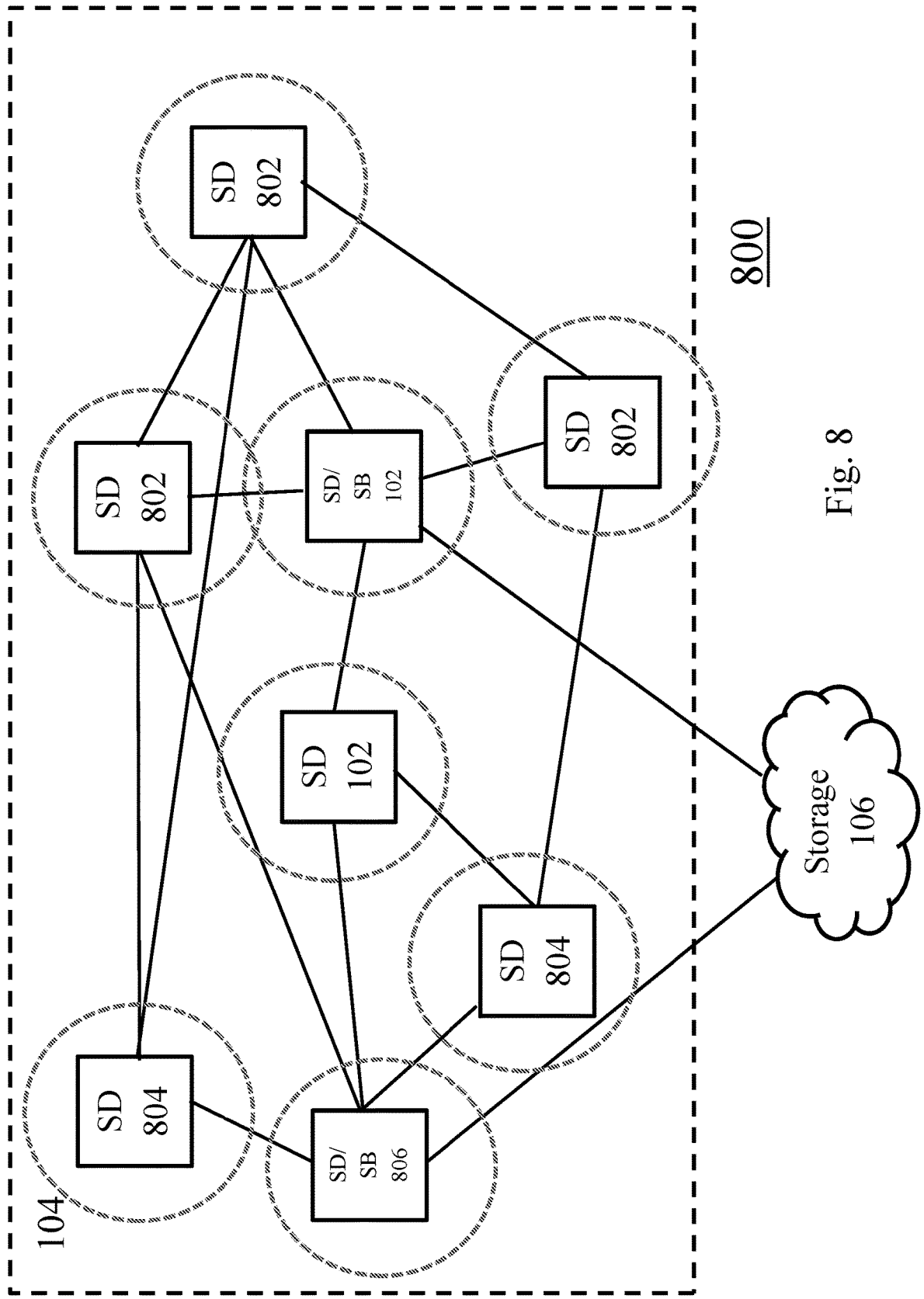
FIG. 8 illustrates a DOME edge detection system in accordance with an exemplary embodiment.

FIG. 8 illustrates that a third multi-node transfer in accordance with an exemplary embodiment of the present disclosure can be implemented in a Distributed Observation Mesh, Expeditionary (DOME) system, which is an example of edge devices sharing compute loads over their mesh network layer 104 for combining their parts of the overall sensor environment to perform mathematical processing on the total sensing picture without relying on compute resources outside of the local devices, in a manner as described herein.

Figure 9:
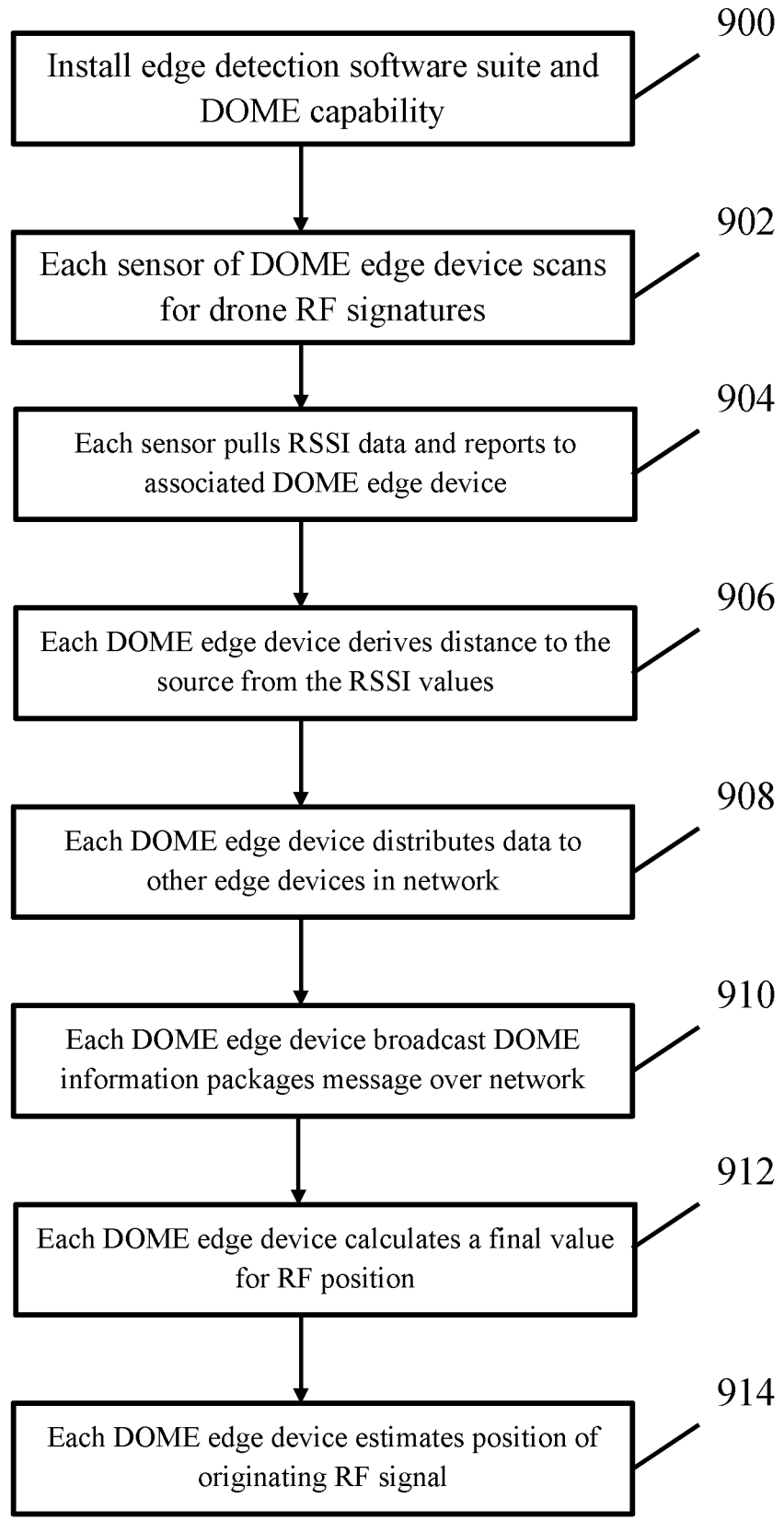
FIG. 9 illustrates a method for estimating a position of an originating signal in a DOME edge detection system accordance with an exemplary embodiment.

FIG. 9 illustrates a method for edge detection in the DOME system of FIG. 8 in accordance with an exemplary embodiment. In step 902, each soldier's edge sensor 802, 804, 806 is configured with an edge detection system software suite including at least a one node 806 configured with a switchboard unit 210. Every other edge sensor device includes a distribution layer unit 220, a mesh network layer unit 230, and a sensor gateway unit 240. In addition, each edge sensor device is loaded with modular DOME capability. In step 904, each edge sensor device 802, 804, 806 passively scans for RF signatures of drones. This is done by a respective edge sensor capability sending polling requests to a sensor connected over BLE. This sensor communication is performed via the sensor gateway 240 that polls the sensors for information, formats the information into a standard format, and stores the information into the sensor log. According to an exemplary embodiment, the data that is stored is the Receive Signal Strength Indicator RSSI of the Wi-Fi source. In step 906, multiple pulls of RSSI information are performed at a respective sensor device 202 and then an average RSSI value per a given period of time (e.g., 1/sec) is reported to the processor 200 and/or memory 205 of the edge device 802, 804, 806.

DOME then uses an algorithm configured to use the average RSSI value to derive an estimated distance to the radio source. This is termed the radius of the source from the observing device (Step 908). The collected data is distributed through the mesh network of edge sensor devices, creating a mobile, distributed RF detection array (Step 910). The DOME capability passes in a DOME Information Package message a radius value for the RF source to the other participating nodes in the mesh network (Step 912). This message contains metadata related to the observation (e.g., time/date, device's unique identifier), GPS location of the observation, and the radius value of the RF signal from this observation point. This is performed by passing the request to the mesh network layer. The mesh network layer uses its Message Handling function to format and send the information to other participating nodes. These receiving nodes process the information via their Message Handlers and send the received data to their running DOME capability, thus combining all device data and storing the data in all devices.

In Step 914, each edge detection device 802, 804, 806 participating in the DOME function calculates a final value for the estimated RF position. As a result, each edge detection device obtains the processed telemetry data from each other device in the mesh network. This data is then analyzed through an ML (e.g., continuously updated) algorithmic function (e.g., using any known position estimating process) to provide the estimated position of the originating signal (step 816).

FIG. 10 illustrates an algorithm for estimating a position of an originating signal in the DOME system of FIG. 8 in accordance with an exemplary embodiment. As shown in FIG. 10, in step 1000 all the points of intersection of the circles (based on the calculated radii) that exist around the detection devices are collected to give the GPS positions of the devices. Next, the points with the highest amount of inclusion of device circles are derived (Step 1010). In step 1020, a centroid position inside these points of highest circle involvement is calculated and converted to a GPS position. Then, a confidence circle is calculated for presentation around the centroid (Step 1030). This value is derived by using a radius equal to the average distance between the centroid and the points that were used to calculate the centroid. In step 1040, the disseminated sensor telemetry data is used to perform trilateration of drone position and display the position using a map overlay, for example. This process is repeated at a specified interval (e.g., 1/sec) to track the position of the RF emitter (Step 1050). Machine learning and artificial intelligence are used to predict the future movements of the drone based on previous observations (Step 1060). In Step 1070, an alert is sent throughout the team via the messenger and also displayed locally to the devices.

System Hardware:

With continued reference to the Figures included herein, a hardware processor 200 of a mobile electronic edge device (e.g., sensor device 102) may be a special purpose or a general-purpose processor device. According to exemplary embodiments of the present disclosure the hardware processor 200 or memory 205 connected to the hardware processor are encoded with a software suite suitable for carrying out the desired processing. The hardware processor device 200 may be connected to a communication infrastructure, such as an internal bus, message queue, network, multi-core message-passing scheme, etc.

The mesh network 104 may be any network suitable for performing the functions as disclosed herein and may include a communications capability configuration for a local area network (LAN), a wide area network (WAN), a wireless network (e.g., Wi-Fi), a mobile communication network, a satellite network, the Internet, fiber optic, coaxial cable, infrared, radio frequency (RF), or any combination thereof. Other suitable network types and configurations will be apparent to persons having skill in the relevant art.

The mobile electronic edge device may also include a memory 205 (e.g., random access memory, read-only memory, etc.), and may also include multiple memories. The memory may be read from and/or written to in a well-known manner. In accordance with an exemplary embodiment, the memory 205 can include non-transitory computer readable recording media (e.g., ROM, RAM hard disk drive, flash memory, optical memory, solid-state drive, etc.). A hardware processor device 200 as discussed herein may be a single hardware processor, a plurality of hardware processors, or combinations thereof. Hardware processor devices may have one or more processor "cores."

Data stored in the mobile electronic edge device (e.g., in the memory) may be stored on any type of suitable computer readable media, such as optical storage (e.g., a compact disc, digital versatile disc), magnetic storage (e.g., a hard disk drive), or solid-state drive. An operating system, one or more applications, and one or more hypervisors can be stored in the memory.

The mobile electronic edge device may also include a communications interface 204 for providing the communication capability. The communications interface 204 may be configured to allow software and data to be transferred between the electronic edge device and other external devices as described herein. Exemplary communications interfaces 204 may include a wireless modem (e.g., transceiver), a network interface (e.g., an Ethernet card), a communications port, a PCMCIA slot and communications card, or any other communication chip, etc. Software and data may be transferred via the communications interface to or from the external devices.

The memories can be non-transitory computer-readable recording media, and may store operating systems and/or computer programs to be executed by the mobile electronic device. Computer programs may also be received via the communications interface. Such computer programs, when executed, may enable the mobile electronic edge device to implement its operative functions. For instance, the operating system and/or computer programs, when executed, may enable the hardware processor device to access or operate hardware components such as a camera, or any desired sensor device, GPS, a peripheral interface, USB/Firewire/Thunderbolt interface ports, and/or display (e.g., LED screen, touch screen, etc.).

Numerous variations of embodiments disclosed herein will be readily apparent to those skilled in the art. In accordance with exemplary embodiments, the one or more smart edge devices can interface optionally to the cloud and be configured with a specially developed operating system kernel, although this is not necessary. Cloud resources may optionally be used with the edge device(s) as disclosed herein, but this is not necessary as the edge device(s) need not be considered extensions of the cloud.

The smart edge software can be configured in a newly developed operating system (OS) or provided as a software install package to an edge device with a pre-existing operating system kernel. The functionality as described herein may thus be a kernel, or it may be an application that runs on another preexisting OS. The functionality as described can be a software and/or firmware load to be loaded on any of different pre-existing hardware platforms. Thus, the functionality as described herein can be a software framework/package (hardware agnostic), that is not embedded specifically within a kernel OS.

Smart edge functionality as described herein is not limited to a subnetwork to a cloud storage network, but rather can be a framework that distributes information locally or via tactical networks, and/or via the cloud if desired.

The smart edge sensors themselves can be peripheral to the device that has the smart edge software framework installed. For example, the sensors themselves can be configured to have the smart edge functionality as described herein installed on them, but this is not necessary and may in some cases not be desired. It is more likely that the smart edge functionality will be installed on a device that is local to the sensors and used in conjunction with those sensors.

Thus, sensors contemplated herein may or may not be intelligent with onboard processing capability. The data also may or may not be requested but pushed to all devices and then the devices decide what they want. The smart edge framework as disclosed herein can be configured to be responsible for performing the enhancing analytics at an edge device.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning, range, and equivalence thereof are intended to be embraced therein.

What is claimed is:

1. An edge device in a system of sensors and other edge devices for acquiring and processing data about an environment, the edge device comprising:
   memory and a processor,
   wherein the memory stores:
      information about the system, the information including libraries identifying a communication and data protocol for each other edge device, for non-edge devices, and for each sensor available to the system, wherein each sensor is configured to monitor the environment;
      information about the environment;
      software code that causes the processor to:
         operate as a sensor gateway for managing communication with the other edge devices and the sensors;
         perform edge environment analytics based on the environment information and sensor data; and
         operate as a switchboard to perform edge switchboard analytics based on the system information;
   wherein when operating as the sensor gateway, the processor:
      manages the communication with the other edge devices, the non-edge devices, and the sensors available to the system based on at least one of the libraries included in the system information;
   wherein when operating as the switchboard, the processor:
      identifies at least a portion of the system information and stores the identified system information in the memory, the system information further including:
         one or more resources associated with any of the other edge devices;
         communication information including protocols, data formats, and properties associated with each of the system, the other edge devices, and the resources associated with the other edge devices; and
         operational status and information associated with each of the system, the other edge devices, and the resources associated with the other edge devices;
      sends a request to another edge device to obtain or update system information for performing the switchboard analytics;
      uses at least one of the libraries in the system information to identify the resources associated with the other edge devices that are available to provide data which can be used in performing the environment analytics;
      sends request to another edge device to obtain environment information;
      establishes a registry of the other edge devices and sensors in the environment;
      manages the use of available communications protocols to communicate with non-edge devices and the other edge devices in the system based on the communication information;

manages a frequency and size of data communicated to another edge device or non-edge device based on a capacity of available communication protocols/channels;

converts system information to appropriate formats and protocols based on the communication information, the conversion enabling communication with the other edge devices and enabling environment information to be provided in formats appropriate for the other edge devices to perform edge environment analytics using that information;

receives a request from another edge device to provide environment information that the requesting edge device requires to perform edge environment analytics;

receives environment information from other edge and non-edge devices; and sends environment information to another edge device in response to a request to provide the environment information the other edge device requires to perform edge environment analytics.

2. The edge device according to claim 1, wherein the sensors include one or more of a GPS unit, a camera, a microphone, an antenna.

3. The edge device according to claim 1, wherein the communication channels and protocols include radio frequency (RF) and other non-Internet Protocol (IP) and/or cellular communication protocols.

4. The edge device according to claim 1, wherein when operating as the switchboard, the processor establishes a connection with another edge device and communicates with the other edge device in an environment lacking an IP and/or cellular communication protocol.

5. The edge device according to claim 1, wherein when operating as the switchboard, the processor connects to the other edge devices and establishes a dynamic ad hoc network.

6. The edge device according to claim 1, wherein when operating as the switchboard, the processor dynamically connects to the other edge devices when in range and in ad hoc fashion to establish a mesh network.

7. The edge device according to claim 6, wherein when operating as the switchboard, the processor establishes alternate communication paths as a function of dynamic changes in the network.

8. The edge device according to claim 1, wherein when operating as the switchboard, the processor accesses a cloud storage.

9. The edge device according to claim 1, wherein when operating as the switchboard, the processor accesses a cloud storage through at least one of the connected edge devices.

10. A non-transitory computer readable medium storing software code for performing a method of acquiring and processing data about an environment, the software code causing a processor of each edge device in a system of edge devices and sensors to perform the method comprising:

operating as a sensor gateway for managing communication with the other edge devices and the sensors;

performing edge environment analytics based on information about the environment and sensor data; and operating as a switchboard to perform edge switchboard analytics based on information about the system, the information including libraries identifying a communication and data protocol for each other edge device, for non-edge devices, and for each sensor available to the system;

wherein when the processor operates as the sensor gateway, the method further comprises the steps of:
managing the communication with the other edge devices, the non-edge devices, and the sensors available to the system based on at least one of the libraries included in the system information;

wherein when the processor operates as the switchboard, the method further comprises the steps of:
identifying at least a portion of the system information and storing the identified system information in the memory, the system information further including:
one or more resources associated with any of the other edge devices;
communication information including protocols, data formats, and properties associated with each of the system, the other edge devices, and the resources associated with the other edge devices; and
an operational status and information associated with each of the system, the other edge devices, and the resources associated with the other edge devices;

sending a request to another edge device to obtain or update system information for performing the switchboard analytics;

using at least one of the libraries in the system information to identify the resources associated with the other edge devices that are available to provide data which can be used in performing the environment analytics;

sending a request to another edge device to obtain environment information;

establishing a registry of the other edge devices and sensors in the environment;

managing a use of available communications protocols to communicate with another edge device or non-edge device in the system based on the communication information;

managing a frequency and size of data communicated to another edge device or non-edge device based on a capacity of available communication protocols/channels;

converting system information to appropriate formats and protocols based on the communication information, the conversion enabling communication with another edge device and enabling environment information to be provided in formats appropriate for the other edge device to use in performing edge environment analytics;

receiving a request from another edge device to provide environment information that the requesting edge device requires to perform edge environment analytics;

receiving environment information from other edge and non-edge devices; and sending environment information to another edge device in response to a request to provide the environment information the other edge device requires to perform edge environment analytics.

11. A method for acquiring and processing data about an environment in a system of edge devices and sensors, each edge device being configured to: operate as a sensor gateway for managing communication with other edge devices and the sensors; perform edge environment analytics based on information about the environment and sensor data; and operate as a switchboard to perform edge switchboard analytics based on information about the system, the information including libraries identifying a communication and data protocol for each other edge device, for non-edge devices, and for each sensor available to the system, the method performed by a processor at each edge device comprising:

when operating as the sensor gateway, the processor performing the steps including:
        managing the communication with the other edge devices, the non-edge devices, and the sensors available to the system based on at least one of the libraries included in the system information; and when operating as the switchboard, the processor performing the steps including:
        identifying at least a portion of the system information and storing the identified system information in the memory, the system information further including:
            one or more resources associated with any of the other edge devices;
            communication information including protocols, data formats, and properties associated with each of the system, the other edge devices, and the resources associated with the other edge devices; and
            an operational status and information associated with each of the system, the other edge devices, and the resources associated with the other edge devices;
        sending a request to another edge device to obtain or update system information for performing the switchboard analytics;
        using at least one of the libraries in the system information to identify the resources associated with the other edge devices that are available to provide data which can enhance the environment analytics;
        sending a request to another edge device to obtain environment information;
        establishing a registry of the other edge devices and sensors in the environment;
        managing the use of available communications protocols to communicate with non-edge devices and the other edge devices in the system based on the communication information;
        managing a frequency and size of data communicated to another edge device or non-edge device based on a capacity of available communication protocols/channels;
        converting system information to appropriate formats and protocols based on the communication information, the conversion enabling communication with another edge device and enabling environment information to be provided in formats appropriate for the other edge device to use in performing edge environment analytics;
        receiving a request for data from another edge device to provide environment information that the requesting edge device requires to perform edge environment analytics;
        receiving environment information from other edge and non-edge devices; and
        sending environment information to another edge device in response to a request to provide the environment information the other edge device requires to perform edge environment analytics.

\* \* \* \* \*